July 14, 1964 A. L. SOLOMON 3,141,093

SIGNAL ENCODER USING ELECTROLUMINESCENT AND PHOTOCONDUCTIVE CELLS

Filed Oct. 21, 1960

INVENTOR
ALLEN L. SOLOMON
BY Theodore Jay Jr.
ATTORNEY 3,141,093

SIGNAL ENCODER USING ELECTROLUMINESCENT AND PHOTOCONDUCTIVE CELLS

Allen L. Solomon, Glen Cove, N.Y., assignor to General Telephone and Electronics Laboratories, Inc., a corporation of Delaware Filed Oct. 21, 1960, Ser. No. 64,125
6 Claims. (Cl. 250—213)

My invention relates to signal encoders.

A signal encoder is an electrical device for converting one or more discrete input signals applied to one or more of a plurality of input terminals into a coded combination of output signals, these output signals appearing at one or more of a plurality of output terminals. In the absence of any input electrical signal, no output signal is produced. When an input signal is supplied to any one input terminal, an output signal will appear at one or more output terminals, as indicated, for example, by a change of potential at these output terminals. The number and relative positions of these output terminals uniquely identify the selected input terminal. Stated differently, when a signal is supplied to one or another input terminal, one or another combination of output signals is produced. There is a one-to-one correspondence between the particular input terminal to which the incoming signal is supplied, and the particular combination of output terminals at which the output signals appear.

I have invented a new type of signal encoder employing electroluminescent and photoconductive elements in place of the transistors, tubes, diodes and other conventional components previously employed. In my encoder, when an input signal is supplied to a selected input terminal, the impedance level at certain output terminals (as referred to a common terminal) is increased relative to the impedance level at the other output terminals, the number and relative positions of these certain output terminals uniquely identifying the selected input terminal. In the absence of an input signal, all output terminals represent low and essentially equal impedance levels.

Many electronic systems utilizing encoders are designed to respond to changes in voltage levels at the encoder output terminals. My encoder can be used to produce changes in voltage levels as required, thus permitting my encoder to be directly substituted for conventional encoders in systems of the type described above.

In accordance with the principles of my invention, my signal encoder includes a plurality of separate, parallel elongated electroluminescent cells arranged in columns, and another plurality of photoconductive cells overlying the columns and arranged in rows. The number of photoconductive cells in any row varies from row to row. Each photoconductive cell overlies only a single column, being optically coupled to and electrically isolated from the electroluminescent cell constituting the single column.

The photoconductive cells in each row are electrically connected in series. One end of each of the rows is connected to a corresponding output terminal. The other end of each of certain selected rows is connected to a common terminal. The other end of each of the unselected rows is coupled to a junction of two adjacent photoconductive cells in one of the selected rows.

Each photoconductive cell, when in the dark, represents a high impedance, when illuminated by the electroluminescent columns to which it is optically coupled, each photoconductive cell represents a relatively low impedance. In the absence of an incoming signal, all electroluminescent columns are energized and emit light, thus triggering all photoconductive cells into the low impedance state. As a consequence the impedance levels at the output terminal (as measured with respect to that of the common terminal) are low and essentially equal. In the presence of an incoming signal, a selected electroluminescent column is deenergized and emits no light. The photoconductive cells optically coupled to this selected column are then triggered into the high impedance state. Under these conditions, the impedance level at certain output terminals rises sharply, the number and relative positions of these certain output terminals uniquely identifying the selected electroluminescent column. The number and relative positions of the certain output terminals vary with the particular electroluminescent column which is deenergized.

In one method of using my encoder, one terminal of a two terminal voltage source is coupled to the common terminal of the encoder. A separate load impedance is coupled between each output terminal and the common terminal of the encoder. The values of these impedances (which are normally equal) are of the same order or higher than the impedance values of the output terminals coupled to rows containing only illuminated photoconductive cells but are much lower than the impedance values of the output terminals coupled to rows containing one or more dark photoconductive cells. As a result, the voltage drops across the load impedances coupled to rows containing one or more dark photoconductive cells are much lower than the voltage drops across the load impedances coupled to rows containing one or more illuminated photoconductive cells.

An illustrative embodiment of my invention will now be described with reference to the accompanying drawings wherein.

Figure 1:
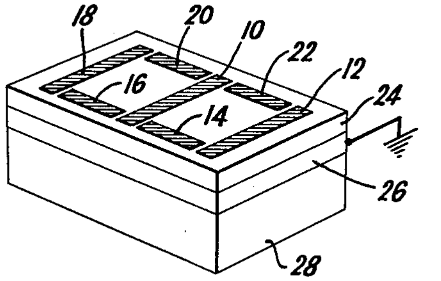
FIG. 1 illustrates a conventional electroluminescent display device which can be operated by my type of encoder.

Referring now to FIG. 1, there is shown an electroluminescent display device for displaying any digit from 0–9 inclusive. This device comprises a glass substrate 28, a grounded electrically conductive film 26, an electroluminescent layer 24, and seven electrically conductive transparent separate electrodes identified as 10, 12, 14, 16, 18, 20 and 22 respectively. When a relatively high voltage is applied between conductive film 26 and all of the electrodes 10–22, the number 8 is displayed. When the voltage is reduced sufficiently at electrode 14 and the original voltage levels are otherwise maintained, the number 9 will be displayed.

Figure 2:
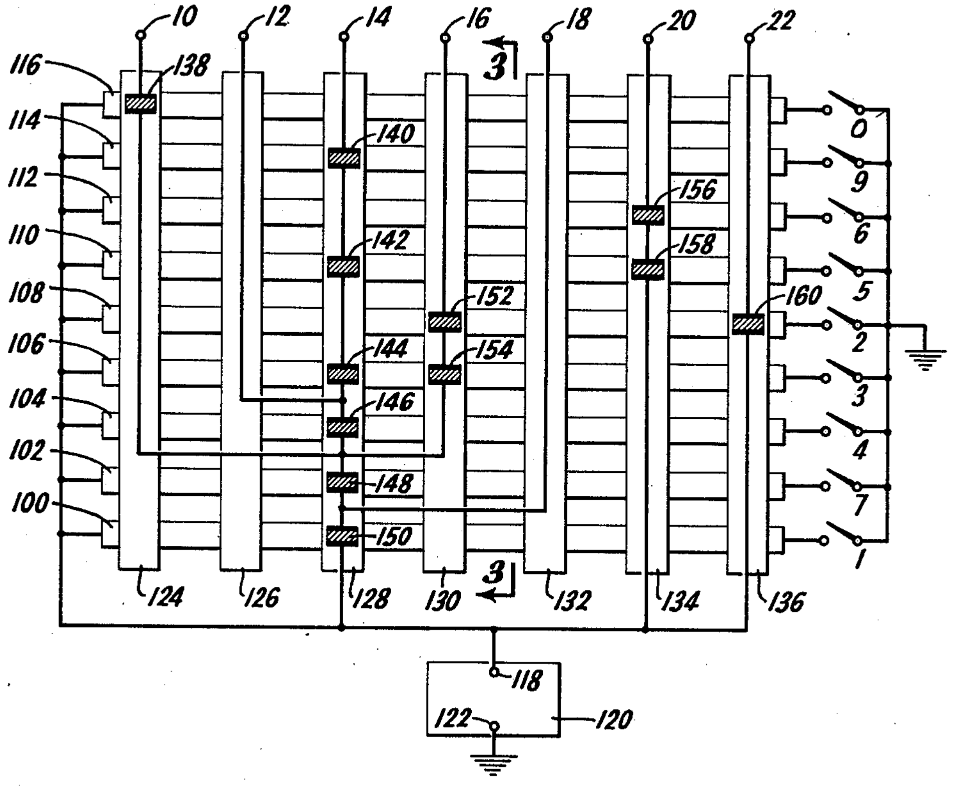
FIG. 2 is a top view of one encoder in accordance with my invention.

Referring now to FIG. 2, there are shown nine elongated separate electroluminescent cells forming columns 100, 102, 104, 106, 108, 110, 112, 114 and 116 respectively. Each of these columns 100–116 is connected at one end to one terminal 118 of a two terminal alternating votlage source 120. (The other terminal 122 of source 120 is grounded.) The other end of each of these columns 100–116 is connected through a corresponding one of switches 1, 7, 4, 3, 2, 5, 6, 9 and 0 to ground. When any of these switches is closed, the corresponding electroluminescent column is energized and emits light; if any switch is open, the corresponding electroluminescent column is deenergized and dark.

Further, there are shown seven separated elongated strips of a transparent insulating material which extend transversely over the columns, these strips being numbered 124, 126, 128, 130, 132, 134 and 136 respectively.

A photoconductive cell 138 is applied over strip 124 and is in registration with and optically coupled to electroluminescent column 116. Similarly, photoconductive cells 140, 142, 144, 146, 148 and 150 are positioned over strip 128 and are optically coupled to columns 114, 110, 106, 104, 102 and 100 respectively; photoconductive cells 152 and 154 overlie strip 130 and are optically coupled to columns 108 and 106 respectively; photoconductive cells 156 and 158 overlie strip 134 and are optically coupled to columns 112 and 110 respectively; and photoconductive cell 160 overlies strip 136 and is optically coupled to column 108.

The device of FIG. 2 is provided with seven output terminals 10, 12, 14, 16, 18, 20 and 22 which are directly connected respectively to electrodes 10, 12, 14, 16, 18, 20 and 22 of the device of FIG. 1.

Referring again to FIG. 2, photoconductive cell 138 is connected between terminal 10 and the junction of photoconductive cells 146 and 148. Terminal 12 is connected to the junction of photoconductive cells 144 and 146. Photoconductive cells 140, 142, 144, 146, 148 and 150 are connected in series between terminal 14 and terminal 118 of the voltage source 120. Photoconductive cells 152 and 154 are connected in series between terminal 16 and the junction of photoconductive cells 146 and 148. Terminal 18 is connected to the junction of photoconductive cells 148 and 150. Photoconductive cells 156 and 158 are connected in series between terminal 20 and terminal 118. Photoconductive cell 160 is connected between terminal 22 and terminal 118.

Each of the photoconductive cells, when dark, is in the high impedance state, the high impedance value being much higher than the impedance of any of the luminous capacitors (which have approximately equal impedance values) formed between each of the electrodes 10, 12, 14, 16, 18, 20 and 22 and the film 26. Further, each of these cells, when illuminated, is in the low impedance state, the low impedance value being much lower than the impedance of any of the capacitors referred to above.

Under these conditions, operation of the interconnected devices of FIGS. 1 and 2 is as follows. When all of the switches of FIG. 2 are open, all electroluminescent columns are dark, and all photoconductive cells are dark. The voltage drop across the luminous capacitors is insufficient to produce light. Therefore, no number is displayed by the device of FIG. 1.

On the other hand, when all of the switches of FIG. 2 are closed, all electroluminescent columns emit light, all photoconductive cells are illuminated, and the voltage drop across each of the luminous capacitors is large enough to energize same, the device of FIG. 1 displaying the number 8. At this point, any digit from 0–9 can be displayed by opening the switch in FIG. 2 identified by the particular digit desired, while all other switches in FIG. 2 remain closed.

For example, if switch 5 in FIG. 2 is opened when all other switches remain closed, the potential at electrodes 14 and 20 of the device of FIG. 1 drops sharply as compared to the much higher potential at all the other electrodes 10, 12, 16, 18 and 22, the luminous capacitors associated with electrodes 14 and 20 do not emit light, and the number 5 is displayed by the device of FIG. 1.

Figure 3:
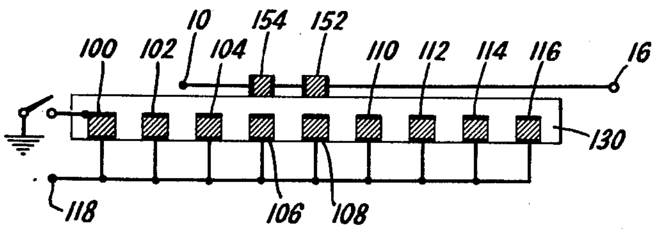
FIG. 3 is a cross sectional view encoder of FIG. 2.

FIG. 3 is a cross sectional view of the device of FIG. 2 taken along line 3—3 of FIG. 2. Referring now to FIG. 3, each of the electroluminescent columns in cross section has a bottom electrode which can be of gold. Further each column has an electroluminescent layer which, for example, can be constituted by electroluminescent phosphor grains embedded in a glass frit or a transparent plastic. Each electroluminescent column further has a top transparent electrode which can be formed, for example, of tin oxide. The transparent insulating strip 130 overlying the columns can be a transparent glass enamel or a plastic. The photoconductive cells 152 and 154, each can consist of two separated electrodes, for example, gold electrodes, covered by a layer of sintered photoconductive cadmium sulfide particles or a layer of such particles embedded in a glass frit.

What is claimed is:

1. A device comprising a plurality of separate, parallel, elongated electroluminescent cells arranged in columns, and another plurality of photoconductive cells overlying said columns and arranged in rows, each photoconductive cell overlying only a single column and being optically coupled to the electroluminescent cell constituting said single column, the photoconductive cells in each row being electrically interconnected in series.

2. A device comprising a plurality of separate, parallel, elongated electroluminescent cells arranged in columns, and another plurality of photoconductive cells overlying said columns and arranged in rows, the number of photoconductive cells in any row varying from row to row, each photoconductive cell overlying only a single column and being optically coupled to the electroluminescent cell constituting said single column, the photoconductive cells in each row being electrically interconnected in series.

3. A device comprising a plurality of separate, parallel, elongated electroluminescent cells arranged in columns, and another plurality of photoconductive cells overlying said columns and arranged in rows, the number of photoconductive cells in any row varying from row to row, each photoconductive cell overlying only a single column and being optically coupled to and electrically isolated from the electroluminescent cell constituting said single column, the photoconductive cells in each row being electrically interconnected in series.

4. A device comprising a plurality of separate, parallel, elongated electroluminescent cells arranged in columns, and another plurality of photoconductive cells overlying said columns and arranged in rows, the number of photoconductive cells in any row varying from row to row, each photoconductive cell overlying only a single column and being optically coupled to and electrically isolated from the electroluminescent cell constituting said single column, the photoconductive cells in each row being electrically interconnected in series, a common terminal, and a group of output terminals equal in number to the number of said rows, one end of each of said rows terminating at a corresponding output terminal, the other end of each of selected ones of said rows terminating at said common terminal, the other end of each of unselected ones of said rows being coupled to a junction of two adjacent photoconductive cells in one of said selected rows.

5. A device comprising a plurality of separate, parallel, elongated electroluminescent cells arranged in columns, and another plurality of photoconductive cells overlying said columns and arranged in rows, the number of photoconductive cells in any row varying from row to row, each photoconductive cell overlying only a single column and being optically coupled to and electrically isolated from the electroluminescent cell constituting said single column, the photoconductive cells in each row being electrically interconnected in series, a common terminal, a group of output terminals equal in number to the number of said rows, one end of each of said rows terminating at a corresponding output terminal, the other end of each of selected ones of said rows terminating at said common terminal, the other end of each of unselected ones of said rows being coupled to a junction of two adjacent photoconductive cells in one of said selected rows; and means to selectively energize at least one of said electroluminescent columns, whereby the photoconductive cells optically coupled to the energized column are triggered into a low impedance state, all other photoconductive cells being in a high impedance state.

6. A device as set forth in claim 5 wherein said means include a plurality of switches, the number of switches being equal to the number of said columns.

References Cited in the file of this patent

UNITED STATES PATENTS

| | | |
|---|---|---|
| 2,950,418 | Reis | Aug. 23, 1960 |
| 2,952,792 | Yhap | Sept. 13, 1960 |
| 2,958,009 | Bowerman | Oct. 25, 1960 |
| 2,966,616 | Mash | Dec. 27, 1960 |
| 2,998,530 | Marshall | Aug. 29, 1961 |
| 3,046,540 | Litz et al. | July 24, 1962 |